(12) United States Patent
Kumar et al.

(10) Patent No.: US 12,323,682 B2
(45) Date of Patent: Jun. 3, 2025

(54) GENERATING BOUNDARY POINTS FOR MEDIA CONTENT

(71) Applicant: Amazon Technologies, Inc., Seattle, WA (US)

(72) Inventors: Abhishek Kumar, Bothell, WA (US); Yongjun Wu, Bellevue, WA (US); Sitaraman Ganapathy, Issaquah, WA (US); Vasanthakumar Soundararajan, Seattle, WA (US); Varun Chadha, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 18/584,266

(22) Filed: Feb. 22, 2024

(65) Prior Publication Data

US 2024/0196068 A1 Jun. 13, 2024

Related U.S. Application Data

(63) Continuation of application No. 17/854,188, filed on Jun. 30, 2022, now Pat. No. 11,949,970.

(51) Int. Cl.
*H04N 21/8547* (2011.01)
*H04N 21/234* (2011.01)
(Continued)

(52) U.S. Cl.
CPC ... *H04N 21/8547* (2013.01); *H04N 21/23418* (2013.01); *H04N 21/812* (2013.01); *H04N 21/8455* (2013.01)

(58) Field of Classification Search
CPC ......... H04N 21/8547; H04N 21/23418; H04N 21/812; H04N 21/8455; H04N 21/44008;
(Continued)

(56) References Cited

U.S. PATENT DOCUMENTS 9,374,604 B2 6/2016 Nemiroff et al.
11,317,172 B1 4/2022 Wu et al.
(Continued)

OTHER PUBLICATIONS

U.S. Appl. No. 17/854,188, "Non-Final Office Action", Aug. 17, 2023, 26 pages.
(Continued)

*Primary Examiner* — Cynthia M Fogg
(74) *Attorney, Agent, or Firm* — Kilpatrick Townsend & Stockton LLP

(57) ABSTRACT

Systems and methods described herein provide for novel boundary generation features for interleaving additional content into media content. Media content may be received which includes a video and audio portion. An unencrypted encode of the video portion may be generated. A first set of time stamps for the video portion may be generated using a computer vision algorithm. A second set of time stamps for the video portion may be generated for identifying IDR frames using a first algorithm. A third set of time stamps may be generated to serve as boundaries for interleaving additional content into the media content based on a priority algorithm that uses the first set of time stamps and the second set of time stamps. The video portion may be encoded using the third set of time stamps to determine the IDR frames for the media content.

20 Claims, 8 Drawing Sheets

(51) Int. Cl.
    *H04N 21/81* (2011.01)
    *H04N 21/845* (2011.01)
(58) Field of Classification Search
    CPC ....... H04N 21/8146; H04N 21/234318; H04N 21/44012; H04N 21/23424; H04N 21/2668; H04N 21/4662
    USPC .......................................................... 725/32
    See application file for complete search history.

(56) References Cited

U.S. PATENT DOCUMENTS

| | | | |
|---|---|---|---|
| 2008/0307454 A1* | 12/2008 | Ahanger | H04N 21/854 725/36 |
| 2014/0150016 A1* | 5/2014 | Feng | G06Q 30/0255 725/34 |
| 2014/0245335 A1 | 8/2014 | Holden et al. | |
| 2015/0281752 A1 | 10/2015 | Van Veldhuisen | |
| 2015/0365736 A1 | 12/2015 | Xiong et al. | |
| 2016/0119679 A1 | 4/2016 | Randall et al. | |
| 2016/0212455 A1 | 7/2016 | Manna | |
| 2017/0163907 A1* | 6/2017 | Connolly | H04N 5/2228 |
| 2017/0374399 A1 | 12/2017 | Rao | |
| 2018/0014086 A1 | 1/2018 | Castano et al. | |
| 2019/0075339 A1 | 3/2019 | Smith | |
| 2020/0204759 A1* | 6/2020 | Liu | H04N 19/40 |
| 2020/0344518 A1* | 10/2020 | Hutchinson | H04N 21/812 |
| 2022/0101013 A1 | 3/2022 | Chatoo et al. | |
| 2023/0007365 A1 | 1/2023 | Farre Guiu et al. | |
| 2023/0118010 A1* | 4/2023 | Amirpour | H04N 19/174 375/240.02 |

OTHER PUBLICATIONS

U.S. Appl. No. 17/854,188, "Notice of Allowance", Nov. 29, 2023, 11 pages.

PCT/US2023/020646, "International Search Report and the Written Opinion", Jul. 24, 2023, 11 pages.

\* cited by examiner though any wording may be used in the disclosure. Time stamps, boundaries, and cue points may indicate areas of media content which are appropriate for interleaving or inserting additional content.

GENERATING BOUNDARY POINTS FOR MEDIA CONTENT

CROSS-REFERENCE TO RELATED APPLICATION

This application is a continuation of and claims priority to U.S. patent application Ser. No. 17/854,188, filed Jun. 30, 2022, and entitled "GENERATING BOUNDARY POINTS FOR MEDIA CONTENT," the content of which is hereby incorporated by reference in its entirety for all purposes.

BACKGROUND

Current media content typically includes video and audio portions which coincide with each other, whether it be a musical score that accompanies a scene or dialogue between characters. However, as media content is encoded or formatted for various platforms and devices, synchronization errors between the audio of the media content and the video of the media content can occur. Moreover, conventional encoding methods introduce static or sporadic windows for introducing additional content. These static or sporadic windows often time occur during a dialogue or otherwise introduce interruptions during playback of the media content, which result in a disjointed viewing experience for viewers. The incorrect insertion of windows and associated additional content can also introduce synchronization errors that can detract from the experience and/or confuse the viewer. Conventional methods of identifying these windows may rely on manual input, which is inefficient and labor intensive.

BRIEF DESCRIPTION OF THE DRAWINGS

Various embodiments in accordance with the present disclosure will be described with reference to the drawings, in which.

DETAILED DESCRIPTION

Figure 1:
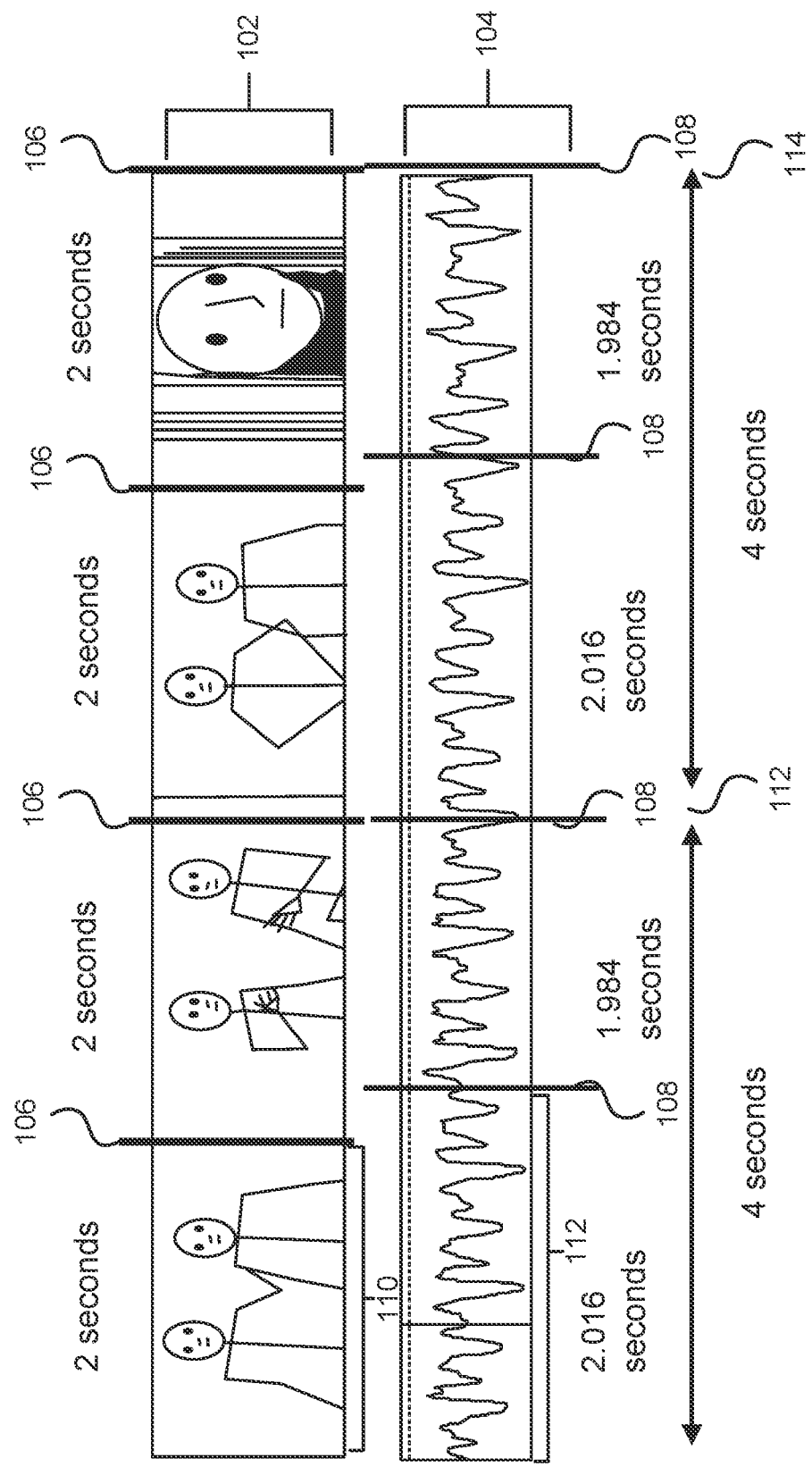
FIG. 1 illustrates an example of static boundaries generated for media content that includes an audio portion and a video portion.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Techniques described herein provide for implementation of a boundary generation feature that generates new boundary locations in media content for interleaving additional content into the media content. The boundary generation feature described herein provides a solution for conventional encoding processes which designate static or sporadic boundary locations within media content. These static or sporadic boundary locations within the media content, if used to interleave additional content such as advertisements, can interrupt a dialogue scene, be in the middle of an action shot, or other inopportune moments, which destroy the viewing experience for viewers. Service provider computers implementing the boundary generation feature can implement and invoke a number of algorithms to identify new boundary locations for a given piece of media content in locations which are more appropriate (e.g., locations where no dialogue is occurring, locations where scene or shot changes are occurring, etc.). The boundary generation features may generate sets of time stamps (e.g., first set of time stamps, second set of time stamps, etc.) which indicate the locations where boundary locations should occur in both the video portion and audio portion of media content that is analyzed and updated.

In embodiments, the time stamps generated by the service provider computers implementing the boundary generation features can be used to insert or update the location of certain types of frames in the video portion of media content—instantaneous decoder refresh (IDR) frames. IDR frames may include frames which act as a reference frame for all following frames (non-IDR frames) until the next IDR frame in a video playback sequence. The IDR frames may serve as the boundary locations which are transmitted to entities, such as content server computers, as opportunities to interleave additional content into the media content during playback. In accordance with at least one embodiment, media content may be received or separated into an audio portion and a video portion with each portion having the audio information and video information, respectively, for the media content. Other information associated with media content may be analyzed to identify appropriate time stamps for boundary locations such as subtitle information or closed captioning information. In accordance with at least one embodiment, the video portion may include a video stream, and the media content may be comprised of fragments. Fragments may include independent downloadable and playable portions of video/audio content for media content. A manifest may include instructions that are transmitted, along with a piece of media content, to a user device to enable the user device to playback or present the piece of media content. A manifest may comprise one or more segments with a segment corresponding to an entry in the manifest that is provided to user devices and pointing to a single video/audio fragment.

Throughout the disclosure: time stamps, boundaries, and cue points (hereinafter referred to as either time stamps and/or boundaries) may be used to denote locations determined by the service provider computers for media content which are appropriate for interleaving additional content. The time stamps and/or boundaries serve as a location or an event to occur such as additional content insertion, transition to additional content or content that has been altered using visual effects. Time stamps and/or boundaries are a video duration location at which a decoder and thereby a video player (e.g., user device) are forced to erase any reference to previously played-back video frames. The time stamps and/or boundaries determine closed video streams, fragmentation, and segmentation boundaries and are thus perforation points that enable video content alterations. IDR frames are frames that force a decoder to mark previously decoded frames as obsolete for referencing and erases them. By encoding video content using the boundaries generated by the boundary generation feature, IDR frames are placed at refresh boundaries, which will define video stream boundaries (group of picture boundaries) as each group of pictures (GOP) begins with an IDR frame. This can be used to fragment strictly at GOP boundaries and segment strictly at fragment boundaries to install expected boundaries for tailoring at playback, such as for inserting additional content. Time stamps may be in a format of hours, minutes, seconds, milliseconds (e.g., HH:MM:SS.Millisecond).

In accordance with at least one embodiment, the service provider computers implementing the boundary generation features may receive media content that includes an audio portion and a video portion. The service provider computers may generate an unencrypted encode for the video portion. As used herein, encode may refer to encoding or an encoding process for converting data from a first format into a second format or different format required for other processes and may include transcoding. In embodiments, a content creator or publisher associated with the media content may transmit the media content to the service provider computers for determining boundaries as well as their intended locations (e.g., time stamps), which represent their desired locations to insert boundaries in the media content for interleaving additional content. The service provider computers may utilize a first algorithm for identifying default IDR frame locations (another set of time stamps) associated with the video portion inserted by encoder algorithms used when generating the media content. In accordance with at least one embodiment, the service provider computers may utilize one or more algorithms such as computer vision markup language (CVML) algorithms (computer vision algorithms), machine learning algorithms, shot or scene detection algorithms, object detection algorithms, or other suitable algorithms to generate yet another set of time stamps by analyzing the unencrypted encode for the video portion. This set of time stamps may correspond to locations in the video portion, which are appropriate for inserting or interleaving additional content such as after dialogue exchanges, during scene or shot changes or transitions, or other appropriate locations as determined by the algorithms.

In embodiments, each determined or received set of time stamps may be associated with a priority which supersedes the priority of another set of time stamps at a given location in the video portion of the media content. For example, a time stamp of a set of time stamps as determined by the CVML algorithm may have priority over a default time stamp generated by the encoder. In embodiments, the service provider computers may utilize a priority algorithm for generating a super set (e.g., third or fourth set) of time stamps which select time stamps from the other sets of generated time stamps (e.g., time stamps received from the content creator and/or publisher, time stamps generated by the default encoder, and time stamps determined by the CVML algorithm or other algorithms) according to the assigned priority for each time stamp. The priority algorithm may utilize the assigned priorities associated with each time stamp of the sets of time stamps determined for the media content. In embodiments, the priorities assigned to each set of time stamps may be configurable. Once the super set of time stamps have been determined for the video portion of the media content, the service provider computers may encode the video portion using this set of time stamps to determine IDR frame placements in target encodes of the media content. The service provider computers implementing the boundary generation features may also encode the audio portion of the media content using the super set of time stamps to synchronize the audio and video portions of the media content using the updated or new IDR placements.

For example, a second algorithm may be used to synchronize first fragments of the audio portion with second fragments of the video portion thereby ensuring that desynchronization during playback does not occur. In accordance with at least one embodiment, prior to encoding the video portion and audio portion, but subsequently to determining the super set of time stamps, the video portion of the media content and the super set of time stamps can be transmitted to the content creator and/or publisher for review and/or input. For example, the content creators and/or publishers can provide input for selecting certain time stamps or overriding the location of certain time stamps within the super set. This input can be received by the service provider computers and used to update the location of the IDR frames and super set of time stamps for the video portion of the media content. Additionally, once the new IDR frame placements have been determined and encoded for the media content, the locations of the IDR frame placements may be provided to other entities, such as content server computers, for providing opportunities to interleave additional content, such as transitions to other content. The techniques described herein provide solutions to problems existing with conventional encoding of media content and interleaving additional content into the media content with static or sporadic boundaries. For example, additional content such as advertisements can be seamlessly interleaved into the media content during playback by determining the best IDR frame locations for the media content. Additional content may be presented after a dialogue scene has concluded instead of during it to avoid interrupting the viewing experience. As yet another use case, the additional content may be interleaved during a scene changes or shot change so as to minimize viewing by users of the media content. Additional opportunities are available, as well, to introduce virtual content placement opportunities using the more exact IDR frame placements as determined by the boundaries using the methods described herein.

FIG. 1 illustrates an example of static boundaries generated for media content that includes an audio portion and a video portion. FIG. 1 illustrates a video portion 102 and an audio portion 104 for a given piece of media content, such as a movie. The solid lines 106 for the video portion 102 and the solid lines 108 for the audio portion 104 represent fixed fragment sizes at various time points of the media content. For example, the lines 106 for the video portion 102 are located approximately every two seconds, whereas the lines 108 for the audio portion 104 are located at various durations such as 2.016 seconds, 1.984 seconds, etc. In embodiments, the fixed fragment sizes represented by 106 and 108 for video portion 102 and audio portion 104, respectively, may be defined or specified by a default encoding process during generation of the media content.

As illustrated by FIG. 1, attempting to interleave content at point 110 of the video would result in desynchronization between the video portion 102 and the audio portion 104. This is because the fixed fragment size for the audio portion 112 is located at 2.016 seconds which does not align with the video portion 102 segment at every two seconds. As such, if content were attempted to be interleaved or transitioned to at point 110 the audio portion 104 of the media content would continue to be played back, clashing with the audio of the interleaved content, for 0.16 seconds. This can cause a disruptive viewing experience for the viewer during playback. As a result, conventional encoding and conventional boundary generation features are left designating boundary points (time stamps) where the audio fragments and video fragments of audio portion 104 and video portion 102 are synchronized. As depicted in FIG. 1, these static synchronization points 112 and 114 are found every four seconds of the audio portion 104 and video portion 102. Although utilizing these four second fragments may resolve any desynchronization problems that may occur when attempting to interleaving additional content it still does not solve all the problems with this static placement of time stamps or boundaries generated using conventional methods. For example, interleaving content at point 112 may result in interrupting a dialogue between two characters of the media content. As another example, interleaving content at point 114 may result in interrupting a tense action scene thus causing a disruptive viewing experience for the viewer. Additionally, minor synchronization errors may still be introduced without the use of boundary points or time stamps as generated by the boundary generation features described herein.

Figure 2:
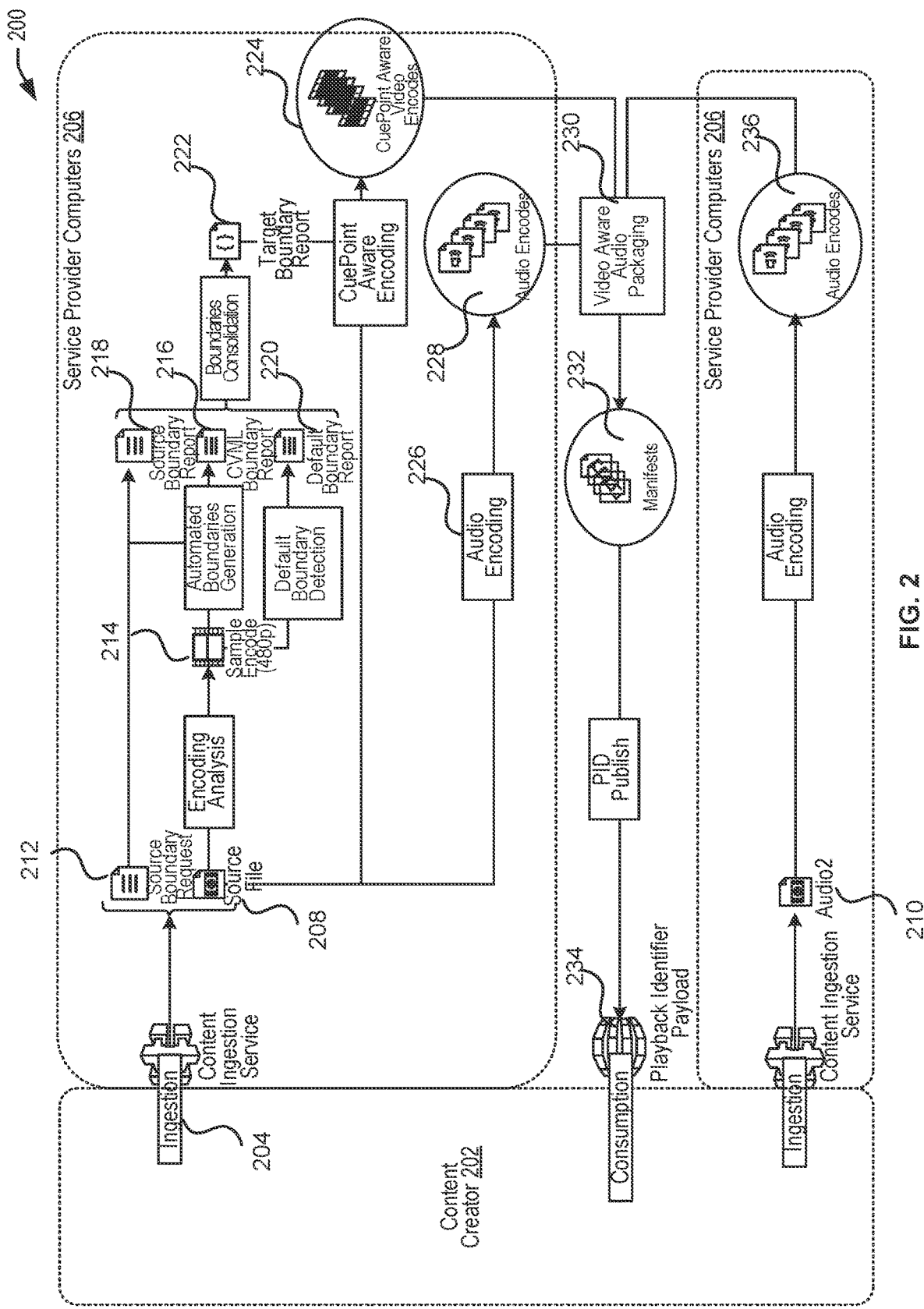
FIG. 2 illustrates an example workflow for encoding video and audio portions of media content using boundary generation features, in accordance with at least one embodiment.

FIG. 2 illustrates an example workflow 200 for encoding video and audio portions of media content using boundary generation features, in accordance with at least one embodiment. The workflow 200 of FIG. 2 includes a content creator 202 providing media content 204 using an ingestion API, to the service provider computers 206 implementing the boundary generation features described herein. As described herein, the media content 204 may include a source file 208 that includes a video portion and an audio portion. The same content creator 202 may provide a separate audio file, audio file 210 which includes the audio for the source file 208. In accordance with at least one embodiment, the content creator 202 may also transmit a source boundary request (first set of time stamps) 212 which includes their desired locations for boundaries for the media content 204. The source file 208 may be received in one or more formats including a Mezzazine format. In workflow 200, the source file 208 undergoes encoding analysis to generate an unencrypted encode 214. As depicted in FIG. 2, the unencrypted encode 214 of the source file 208 may be in a different format and/or quality. For example, the unencrypted encode 214 is at 480p quality which may be different than the 1080p quality of the source file 208. In embodiments, the service provider computers 206 may generate a number of sample encodes at various qualities using the source file 208. In some embodiments, the encoding analysis or encoding process is performed on the video portion of the source file 208.

As described herein, the service provider computers 206 may utilize one or more algorithms, such as CVML algorithms, machine learning algorithms, scene/shot change detection algorithms etc., to generate a set of time stamps (represented at CVML boundary report 216 (second set of time stamps) using an automated boundary generation process. The set of time stamps of the CVML boundary report 216 are generated by the CVML algorithms analyzing the unencrypted encode 214 which comprises the automated boundary generation process. In embodiments, the source boundary request 212 is consolidated or altered into source boundary report 218. In accordance with at least one embodiment, the unencrypted encode 214 of the source file 208 may be analyzed or otherwise processed by another algorithm (first algorithm) and/or default encoder to generate a default boundary report 220 (third set of time stamps). The workflow 200 of FIG. 2 includes the service provider computers 206 generating target boundary report 222 (fourth set of time stamps/super set of time stamps) using a boundary consolidation process. Although not illustrated, this target boundary report 222 can be transmitted back to the content creator 202 by the service provider computers 206 for review and for providing input which can be used to modify the particular time stamps included in the target boundary report 222 for source file 208.

In accordance with at least one embodiment, the boundaries consolidation process (e.g., generation of the super set of time stamps/third set of time stamps/fourth set of time stamps) includes using a priority algorithm that selects the time stamps from the various sets of time stamps (source boundary report 218, CVML boundary report 216, and default boundary report 220) according to a priority assigned to each time stamp of reports 216-220. The priority algorithm may select one particular time stamp from the various sets of time stamps included in reports 216-220 for a given time point or time duration of the source file 208 using the priority assigned with each particular time stamp. In embodiments, input provided by the content creator 202 may be used to override certain assigned priorities or selection made by the priority algorithm of the service provider computers 206. This input may be used to update the target boundary report 222 (super set of time stamps) prior to encoding the source file 208. As depicted in FIG. 2, the workflow 200 includes encoding the source file 208 using the IDR placements as defined by the target boundary report 222 to generate cuepoint aware video encodes 224.

The workflow 200 of FIG. 2 also depicts the media content 204 undergoing audio encoding 226 to generate audio encodes 228. In accordance with at least on embodiment, the service provider computers 206 may use an algorithm (second algorithm) for synchronizing first fragments of the audio portion 210 with second fragments of the source file 208 as encoded at 224. The algorithm may be configured to synchronize the audio portion 210 with the video portion of the source file 208 by inserting or placing boundaries in the audio portion 210 at locations where the boundaries are placed in the video portion of the source file 208 as encoded at 224 at the video aware audio packaging 230. In accordance with at least one embodiment, the service provider computers 206 may generate one or more manifests 232 using the audio encodes 228 and cuepoint aware video encodes 224. The workflow 200 includes publishing or transmitting the manifests 232 as a payload 234 to the content creator 202. As illustrated in FIG. 2, the service provider computers may utilize other algorithms or processes to analyze audio portion 210 to generate audio encodes 236 for generating manifests 232. The generation of the audio encodes 236 may include encoding audio for other languages or secondary audio for the source file 208.

Figure 3:
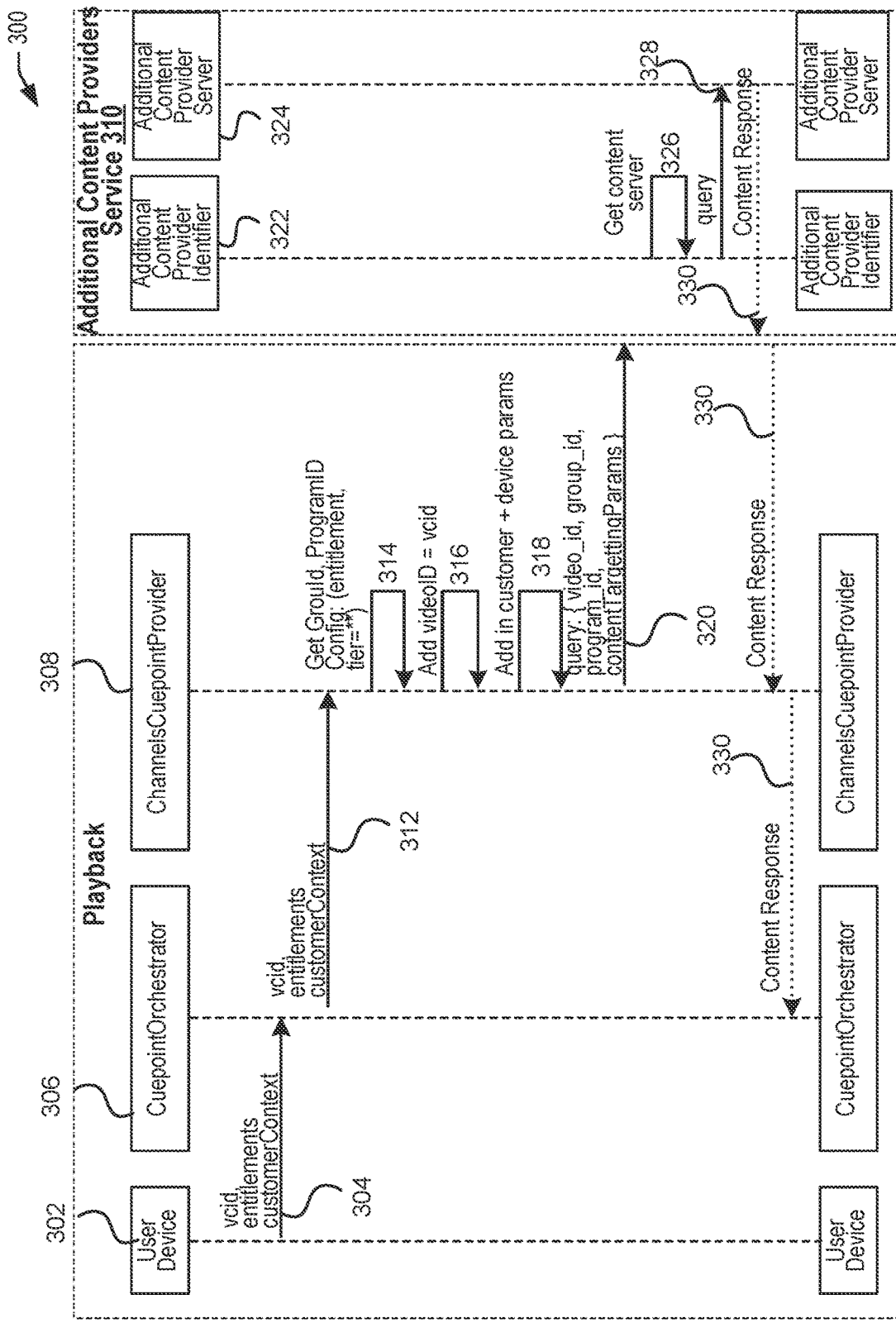
FIG. 3 illustrates an example workflow for interleaving additional content into media content using boundaries generated from the boundary generation feature, in accordance with at least one embodiment.

FIG. 3 illustrates an example workflow 300 for interleaving additional content into media content using boundaries generated from the boundary generation feature, in accordance with at least one embodiment. The workflow 300 includes user device 302 playing back media content that includes, or is encoded, using the determined boundaries described herein and associated with the boundary generation features. The user device 302, may, during playback, dynamically make a request for additional content at 304. The request for additional content at 304 may be made in real time as the user device 302 is playing back or presenting the media content. The request for additional content at 304 may be transmitted to cuepointorchestrator 306 which may be implemented by the service provider computers (not pictured) implementing the boundary generation features described herein. In embodiments, the service provider computers may also implement channelscucpointprovider 308 for interacting with the additional content providers service 310. In accordance with at least one embodiment, the request 304 may include a VCID, an indication of any benefits or entitlements associated with a user associated with the user device 302, and customerContext information which may include information associated with the user such as geographical information or other information obtained from a user profile associated with the user.

The cuepointorchestrator 306 may transmit the request 304, at 312, to the channelscuepointprovider 308. In embodiments, the channelscuepoint provider 308, in workflow 300, may be configured to get a program ID associated with the media content being displayed via user device 302 at 314. In embodiments, the channelscuepoint provider 308 may add a videoID to the request 304 using the program ID of 314 at 316. The workflow 300 includes the channelscuepoint provider 308 adding or updating the request 304 with customer parameters (customer information from 304 and 312) as well as device parameters of user device 302 to the request 304 at 318. The channelscuepoint provider 308 may transmit the updated request 318 to the additional content providers service 310 at 320. In embodiments, the additional content providers service 310 of workflow 300 includes additional content provider identifier 322 and additional content provider server 324. Although FIG. 3 depicts a single additional content provider server 324 it should be noted that multiple additional content provider servers may be interacted with or otherwise communicated with to request content. The additional content provider identifier 322 may get or identify a content server at 326 using the details of updated request 320. The additional content provider identifier 322 may query 328 for additional content from the additional content provider server 324 once it has been identified or determined at 326. The workflow 300 of FIG. 3 includes the additional content provider server 324 transmitting the content response 330 back to the channelscuepoint provider 308, which in turn transmits the content response to cucpointorchestrator 306. In embodiments, the content response 330 may include additional content which may be seamlessly interleaved into the media content playing back the user device 302 at one of the boundary locations specified for the media content. Content response 330 of FIG. 3 is depicted using dashed line arrows to represent if the additional content provider server provides a response (e.g., additional content) as situations may occur where no additional content is provided.

Figure 4:
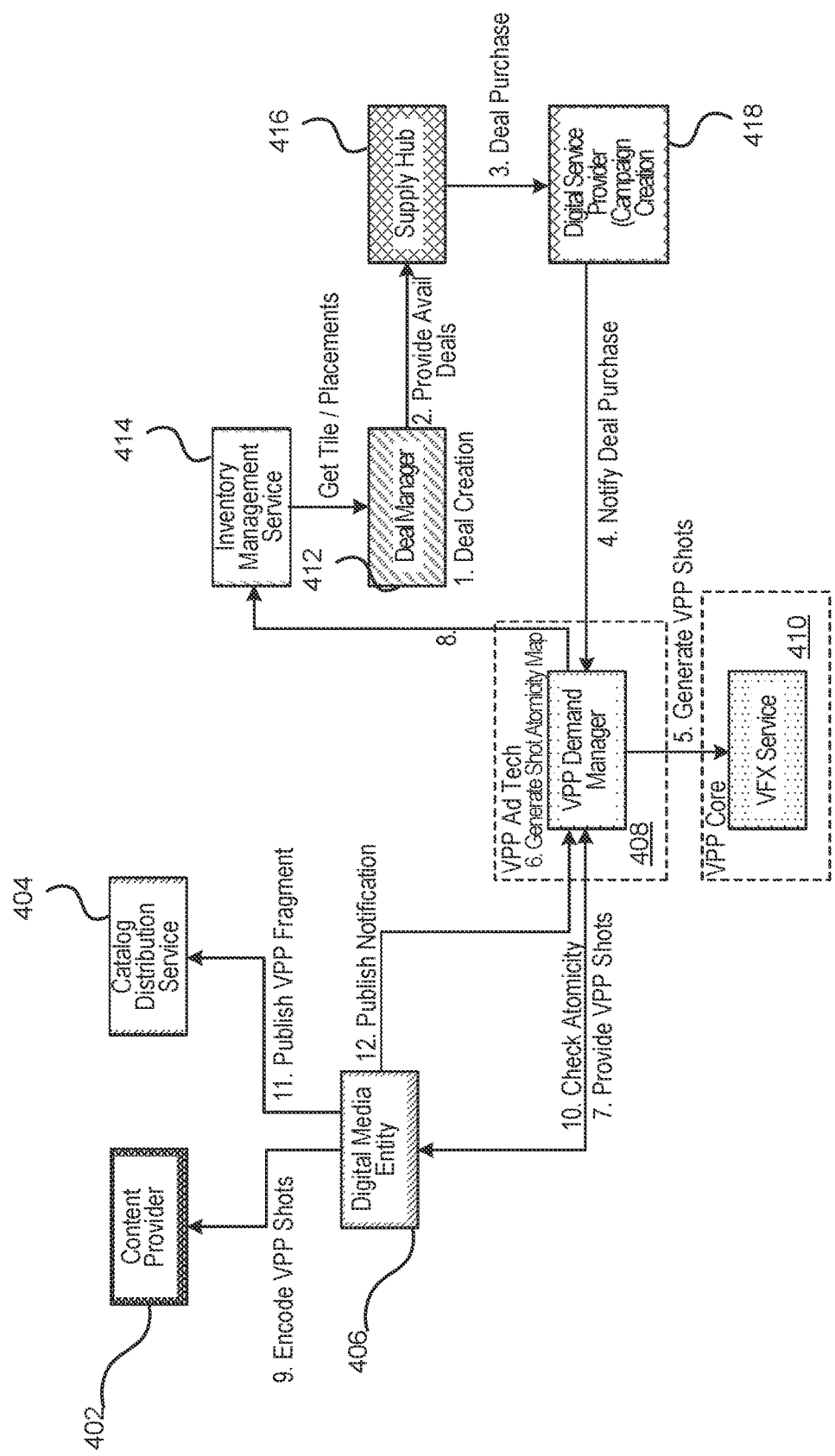
FIG. 4 illustrates an example workflow for interleaving additional content which corresponds to virtual content placement into media content using boundaries generated from the boundary generation feature, in accordance with at least one embodiment.

FIG. 4 illustrates an example workflow 400 for interleaving additional content which corresponds to virtual content placement into media content using boundaries generated from the boundary generation feature, in accordance with at least one embodiment. In embodiments, workflow 400 includes playback system 402 (content provider), catalog system 404 (catalog distribution service), digital media entity 406 which include modules 408 and 410, deal manager 412, inventory management service 414, supply hub 416, and digital service provider (campaign creation system) 418. Workflow 400 depicted in FIG. 4 also includes a process for interleaving content that has virtual content placement generated for a scene or shot of the media content. For example, a scene of a movie (media content) may include a billboard which includes an advertisement for a certain brand of shoe. The boundary generation features described herein can implement object detection algorithms or other algorithms for identifying such scenes or shots, identify the timestamp during the duration of the media content, and generate boundary points (time stamps) for the media content as a potential location for virtual content placement into the media content. For example, visual effects may replace the billboard in the scene with an advertisement for a certain brand of soft drink. The generated scene with the visual effects can then be seamlessly interleaved during playback of the media content using the boundaries generated by the boundary generation features described herein.

The process of FIG. 4 includes deal manager 412 selecting media content that has been analyzed and includes opportunities for virtual content placement by communicating with inventory management service 414 at step 1. The selected media content with opportunities may be transmitted by the deal manager 412 to supply hub 416 at step 2. The process of FIG. 4 includes the supply hub 416 communicating with digital service provider 418 which selects the desired media content and opportunities to introduce virtual content placement at step 3. The process of FIG. 4 includes the digital service provider 418 communicating with module 408 of digital media entity 406 at step 4 to notify the selection of the virtual content placement for certain media content. In embodiments, the module 408 may communicate with module 410 to generate visual effect shots or scenes which will be used to replace certain shots or scenes in the indicated media content at step 5.

The process of FIG. 4 includes module 408 generating a shot atomicity map at step 6 which can be used to map between the shots or scenes originally included in the media content as the ones which will be replaced or interleaved with the visual effects scenes or shots generated at step 5. The process of FIG. 4 includes the module 408 transmitting the visual effects scenes or shots to the digital media entity 406 at step 7. The module 408 may also transmit, at step 8, the generated shot atomicity map to the inventory management service 414. In accordance with at least one embodiment, the digital media entity 406 may generate and provide the encoded virtual content placement shots to the content provider 402 at step 9. This can occur in an offline process or during real-time playback or presentation by the content provider 402 of the selected media content of step 3 and 4. During playback the content provider 402 and digital media entity 406 may check the atomicity at step 10 to ensure that the correct scenes or shots are interleaved with the visual effects additional content generated by module 410. In embodiments, the replaced shot or scene may be published as a VPP fragment at step 11 to catalog distribution 404. The publication notification at step 12 may be transmitted by the digital media entity 406 to module 408 for updating mapping and record keeping.

Figure 5:
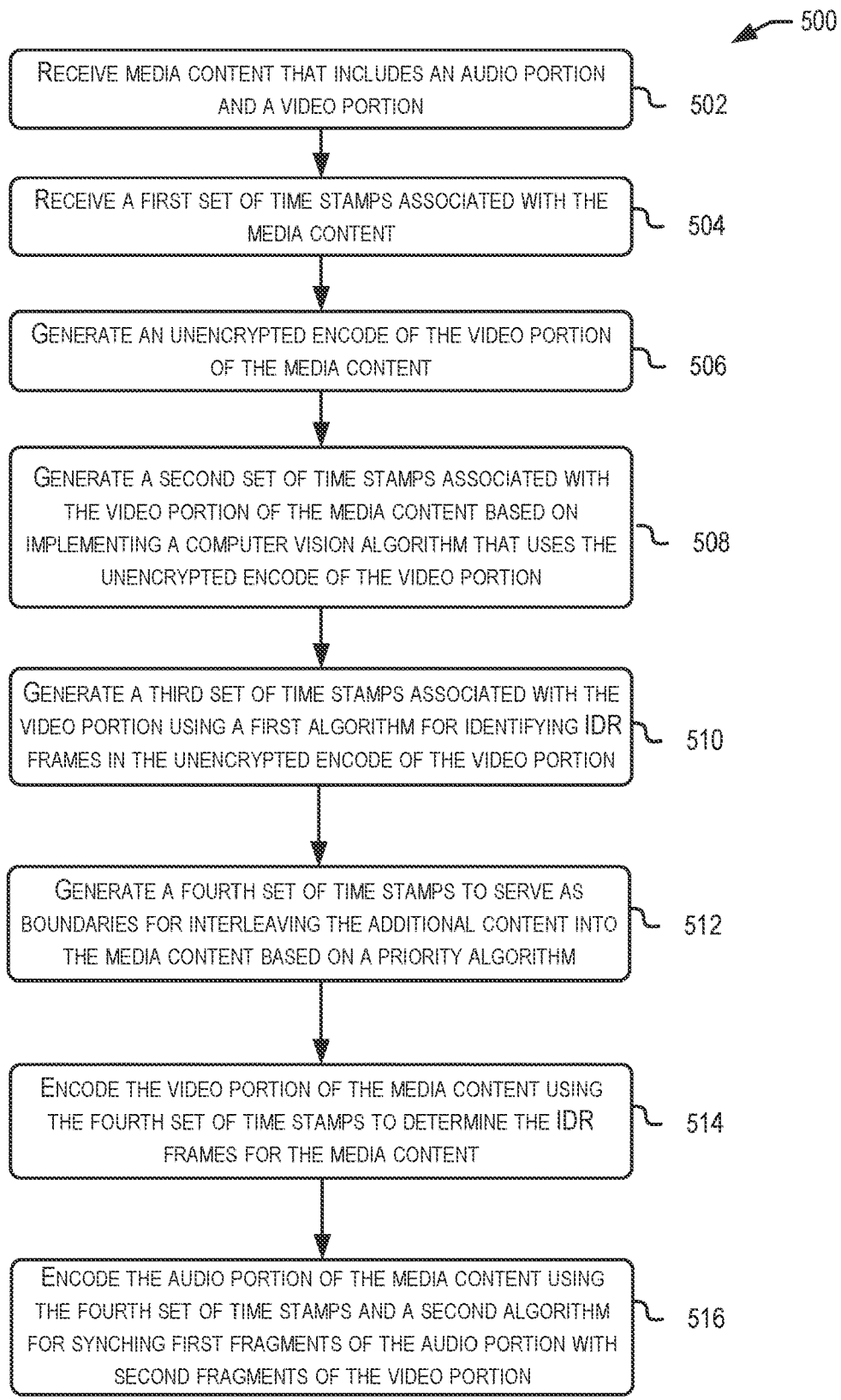
FIG. 5 illustrates an example flow chart for a boundary generation feature, in accordance with at least one embodiment.
Figure 6:
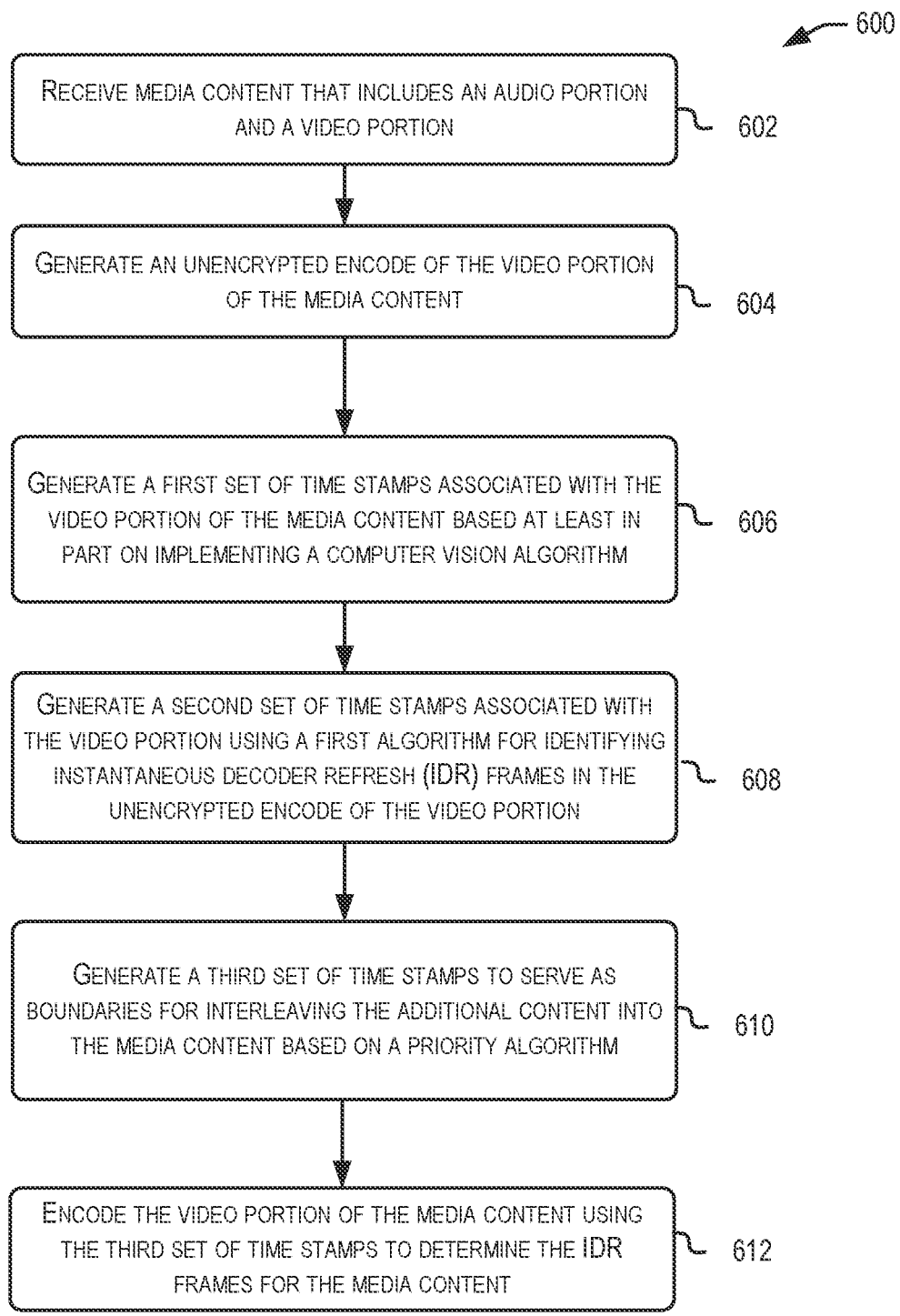
FIG. 6 illustrates an example flow chart for a boundary generation feature, in accordance with at least one embodiment.

FIGS. 5 and 6 illustrate example flow charts for boundary generation features, according to embodiments. These processes are illustrated as a logical flow diagram, each operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer executable instructions include routines, programs, objects, components, data structures, and the like that perform particular functions or implement particular data types. The order in which the operations are described is not intended to be construed as a limitation, and any number of the described operations can be combined in any order and/or in parallel to implement the process.

Additionally, some, any, or all of the processes (or any other processes described herein, or variations and/or combinations thereof) may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable storage medium, for example, in the form of a computer program including a plurality of instructions executable by one or more processors. The computer-readable storage medium may be non-transitory.

Figure 7:
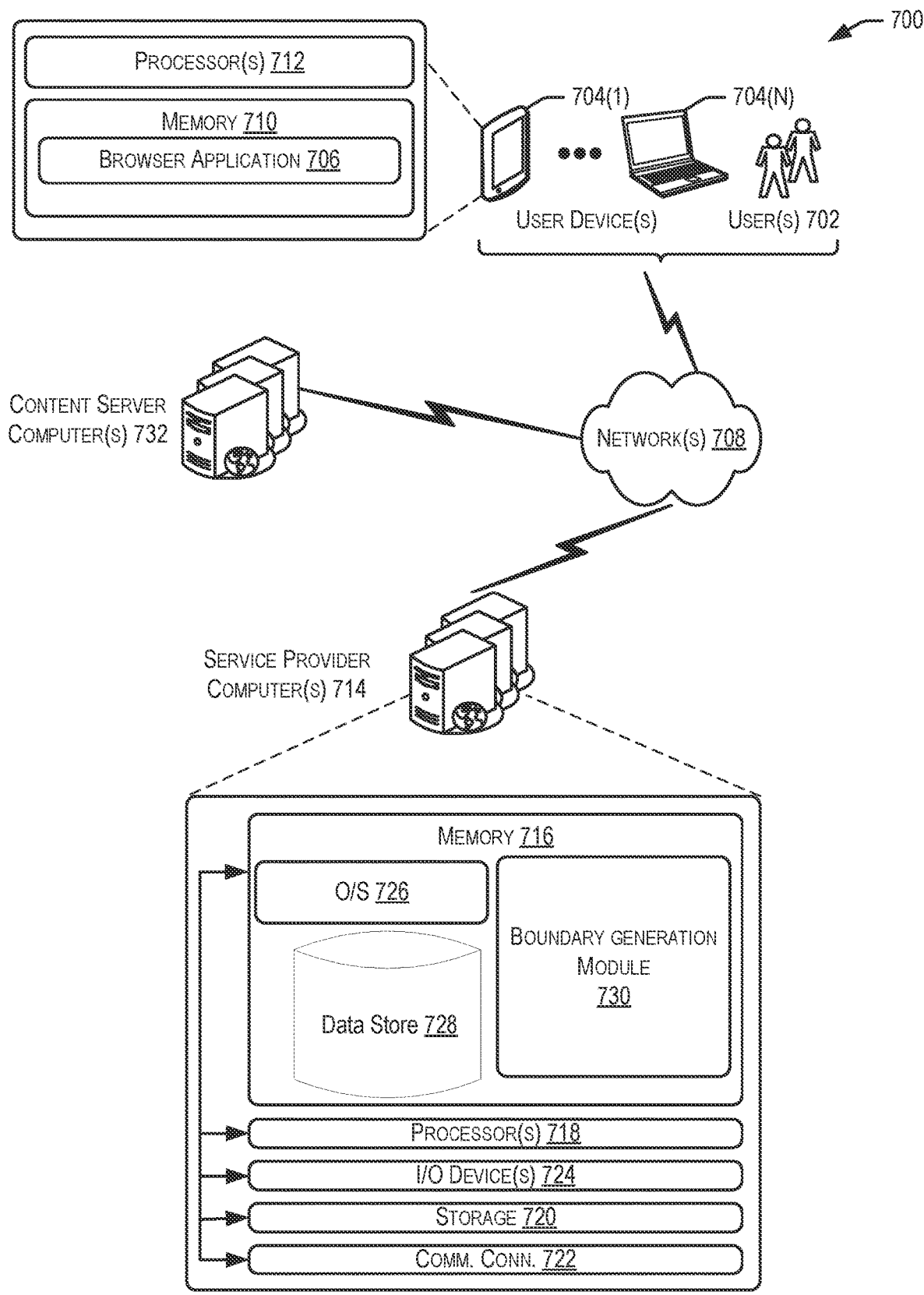
FIG. 7 illustrates an example architecture for a boundary generation feature that includes one or more service provider computers, user devices, and content server computers, in accordance with at least one embodiment.

In some examples, service provider computers (service provider computers 714) utilizing at least the boundary generation module 730 depicted in FIG. 7 may perform the processes 500 and 600 of FIGS. 5 and 6. In FIG. 5, the process 500 may include receiving media content that includes an audio portion and a video portion at 502. In embodiments, the service provider computers may receive media content from content creators or publishers and analyze the media content for appropriate boundary locations to modify the default boundary locations currently associated with the media content. This process can be performed in an offline mode prior to the content creators or publishers providing the media content to a user device for playback or presentation.

The process 500 may include receiving a first set of time stamps associated with the media content at 504. In embodiments, the first set of time stamps may correspond to desired locations, specified by the content creators or publishers associated with the media content, for boundary locations which serve as potential opportunities to interleave additional content during playback of the media content. The first set of time stamps may be provided to the service provider computers implementing the boundary generation feature via available networks such as the Internet and from one or more computers or servers associated with the content creator(s) or publisher(s). The process 500 may include generating an unencrypted encode of the video portion of the media content at 506. In embodiments, the service provider computers implementing the boundary generation features may generate the unencrypted encode of the video portion of the media content at a different quality than the quality of the media content. For example, the media content may be received in a 1080p quality whereas the unencrypted encode of the video portion may be generated at 480p quality.

The process 500 may include generating a second set of time stamps associated with the video portion of the media content based on implementing a computer vision (CV) algorithm that uses the unencrypted encode of the video portion at 508. In embodiments, the CV algorithm may be configured to use the unencrypted encode of the video portion to identify appropriate spots for boundaries to interleave content without interrupting the playback of the media content. For example, the CV algorithm may be configured to identify dialogue exchanges, the end of such exchanges, transitions between shots or scenes, or other situations where interleaving additional content would not cause a disruption to the viewer of the media content. The process 500 may include generating a third set of time stamps associated with the video portion using a first algorithm for identifying IDR frames in the unencrypted encode of the video portion at 510. In embodiments, the first set, second set, and third set of time stamps may identify potential locations, within the media content, for interleaving additional content into the media content.

The process 500 may include generating a fourth set of time stamps to serve as boundaries for interleaving the additional content into the media content based on a priority algorithm at 512. In embodiments, the priority algorithm may be configured to select or identify a set of time stamps (fourth time stamps) from the priority assigned to each time stamp of the first, second, and third sets of time stamps. In accordance with at least one embodiment, this selected or identified set of time stamps may be provided back to a content provider or publisher associated with the media content for approval and/or review. The content provider or publisher may review the transmitted time stamps and provide override input for selecting other time stamps in place of some or all of the time stamps provided to them (e.g., override input overrides any assigned priority for said time stamps). The process 500 may include encoding the video portion of the media content using the fourth set of time stamps to determine IDR frames for the media content at 514. The process 500 may include encoding the audio portion of the media content using the fourth set of time stamps and a second algorithm for synching first fragments of the audio portion with second fragments of the video portion at 516. In embodiments, synching the fragments of the audio with the video using the IDR frame placements derived from the fourth set of time stamps ensures that the compiled media content from the audio and video encoding do not include areas of desynchronization, even with the introduction of additional content at any of the potential boundary locations of the media content.

The process 600 of FIG. 6 includes receiving media content that includes an audio portion and a video portion at 602. The process 600 of FIG. 6 includes generating an unencrypted encode of the video portion of the media content at 604. The process 600 of FIG. 6 includes generating a first set of time stamps associated with the video portion of the media content based at least in part on implementing a CV algorithm at 606. The process 600 of FIG. 6 includes generating a second set of time stamps associated with the video portion using a first algorithm for identifying IDR frames in the unencrypted encode of the video portion at 608. The process 600 includes generating a third set of time stamps to serve as boundaries for interleaving the additional content into the media content based on a priority algorithm at 610. The process 600 includes encoding the video portion of the media content using the third set of time stamps to determine the IDR frames for the media content at 612.

In embodiments, the unencrypted encode of the video portion of the media content includes using a constant variable bit rate. In accordance with at least one embodiment, the service provider computers implementing the boundary generation features described herein may be configured to train and implement one or more machine learning models for identifying dialogue changes or scene changes within media content by analyzing the video portion, the audio portion, and/or subtitle information or close caption information associated with the media content. In embodiments, the service provider computers may provide information, such as metadata, instructions, or manifests, to user devices for interleaving additional content provided by content server computers or other entities into the media content during playback at one of the boundary locations as identified by the IDR frames and/or time stamps.

FIG. 7 illustrates an example architecture for a boundary generation feature that includes one or more service provider computers, user devices, and content server computers, in accordance with at least one embodiment. In architecture 700, one or more users 702 (e.g., customers, users, consumers, etc.,) may utilize user computing devices 704(1)-(N) (collectively, user devices 704) to access a browser application 706 or a user interface (UI) accessible through the browser application 706, via one or more networks 708 to request content including media content such as movies, films, TV shows, or streaming content. The "browser application" 706 can be any browser control or native application that can access and display a network page or other information such as a user interface of a native software application for enabling the selection or interaction of content such as media content. A native software application may include an application or program that has been developed for use on a particular platform (such as an operating system) or a particular device (such as a particular type of mobile device or user device 704). In embodiments, the user device 704 may include one or more components for enabling the user 702 to interact with the browser application 706.

The user devices 704 may include at least one memory 710 and one or more processing units or processor(s) 712. The memory 710 may store program instructions that are loadable and executable on the processor(s) 712, as well as data generated during the execution of these programs. Depending on the configuration and type of the user devices 704, the memory 710 may be volatile (such as random access memory (RAM)) and/or non-volatile (such as read-only memory (ROM), flash memory, etc.). The user devices 704 may also include additional removable storage and/or non-removable storage including, but not limited to, magnetic storage, optical disks, and/or tape storage. The disk drives and their associated non-transitory computer-readable media may provide non-volatile storage of computer-readable instructions, data structures, program modules, and other data for the user devices 704. In some implementations, the memory 710 may include multiple different types of memory, such as static random access memory (SRAM), dynamic random access memory (DRAM), or ROM.

Turning to the contents of the memory 710 in more detail, the memory 710 may include an operating system and one or more application programs or services for implementing the features disclosed herein. Additionally, the memory 710 may include one or more modules for implementing the features described herein including the boundary generation module 730.

The architecture 700 may also include one or more service provider computers 714 that may, in some examples, provide computing resources such as, but not limited to, client entities, low latency data storage, durable data store, data access, management, virtualization, hosted computing environment or "cloud-based" solutions, electronic content performance management, etc. The service provider computers 714 may implement or be an example of the service provider computer(s) described herein with reference to FIGS. 1-6 and throughout the disclosure. The one or more service provider computers 714 may also be operable to provide site hosting, computer application development, and/or implementation platforms, combinations of the foregoing, or the like to the one or more users 702 via user devices 704.

In some examples, the networks 708 may include any one or a combination of many different types of networks, such as cable networks, the Internet, wireless networks, cellular networks, and other private and/or public networks. While the illustrated examples represents the users 702 communicating with the service provider computers 714 over the networks 708, the described techniques may equally apply in instances where the users 702 interact with the one or more service provider computers 714 via the one or more user devices 704 over a landline phone, via a kiosk, or in any other manner. It is also noted that the described techniques may apply in other client/server arrangements (e.g., set-top boxes, etc.), as well as in non-client/server arrangements (e.g., locally stored applications, peer-to-peer arrangements, etc.).

The one or more service provider computers 714 may be any type of computing devices such as, but not limited to, a mobile phone, a smart phone, a personal digital assistant (PDA), a laptop computer, a desktop computer, a server computer, a thin-client device, a tablet PC, etc. Additionally, it should be noted that in some embodiments, the one or more service provider computers 714 may be executed by one or more virtual machines implemented in a hosted computing environment. The hosted computing environment may include one or more rapidly provisioned and released computing resources, which computing resources may include computing, networking, and/or storage devices. A hosted computing environment may also be referred to as a cloud computing environment or distributed computing environment. In some examples, the one or more service provider computers 714 may be in communication with the user device 704 via the networks 708, or via other network connections. The one or more service provider computers 714 may include one or more servers, perhaps arranged in a cluster or as individual servers not associated with one another.

In one illustrative configuration, the one or more service provider computers 714 may include at least one memory 716 and one or more processing units or processor(s) 718. The processor(s) 718 may be implemented as appropriate in hardware, computer-executable instructions, firmware, or combination thereof. Computer-executable instruction or firmware implementations of the processor(s) 718 may include computer-executable or machine-executable instructions written in any suitable programming language to perform the various functions described when executed by a hardware computing device, such as a processor. The memory 716 may store program instructions that are loadable and executable on the processor(s) 718, as well as data generated during the execution of these programs. Depending on the configuration and type of the one or more service provider computers 714, the memory 716 may be volatile (such as RAM) and/or non-volatile (such as ROM, flash memory, etc.). The one or more service provider computers 714 or servers may also include additional storage 720, which may include removable storage and/or non-removable storage. The additional storage 720 may include, but is not limited to, magnetic storage, optical disks and/or tape storage. The disk drives and their associated computer-readable media may provide non-volatile storage of computer-readable instructions, data structures, program modules, and other data for the computing devices. In some implementations, the memory 716 may include multiple different types of memory, such as SRAM, DRAM, or ROM.

The memory 716, the additional storage 720, both removable and non-removable, are all examples of non-transitory computer-readable storage media. For example, computer-readable storage media may include volatile or non-volatile, removable or non-removable media implemented in any method or technology for storage of information such as computer-readable instructions, data structures, program modules, or other data. The memory 716 and the additional storage 720 are all examples of non-transitory computer storage media. Additional types of non-transitory computer storage media that may be present in the one or more service provider computers 714 may include, but are not limited to, PRAM, SRAM, DRAM, RAM, ROM, EEPROM, flash memory or other memory technology, CD-ROM, DVD, or other optical storage, magnetic cassettes, magnetic tape, magnetic disk storage or other magnetic storage devices, or any other medium which can be used to store the desired information and which can be accessed by the one or more service provider computers 714. Combinations of any of the above should also be included within the scope of non-transitory computer-readable media.

The one or more service provider computers 714 may also contain communication connection interface(s) 722 that allow the one or more service provider computers 714 to communicate with a data store, another computing device or server, user terminals, and/or other devices on the networks 708. The one or more service provider computers 714 may also include I/O device(s) 724, such as a keyboard, a mouse, a pen, a voice input device, a touch input device, a display, speakers, a printer, etc.

Turning to the contents of the memory 716 in more detail, the memory 716 may include an operating system 726, one or more data stores 728, and/or one or more application programs or services for implementing the features disclosed herein including the boundary generation module 730. In embodiments, the service provider computers 714 and/or user devices 704 may be in communication with content server computers 732 via networks 708. In embodiments, the service provider computers 714 may provide content, generated time stamps which correspond to identified boundary points for media content, ad opportunities, etc., to the content server computers 732 and/or content creators or publishers (not pictured). The content server computers 732 may respond to requests for additional content from the user devices 704 and/or service provider computers 714. This can be done asynchronously or in real-time as media content is generated or presented by service provider computers 714 and/or user devices 704. In accordance with at least one embodiment, the boundary generation module 730 may be configured to at least receive media content that includes an audio portion and a video portion from one or more content creators or publishers (not pictured). In embodiments, the boundary generation module 730 and service provider computers 714 may receive a first set of time stamps associated with the media content which correspond to desired points of the media content for boundary points which serve as opportunities to interleave additional content.

The boundary generation module 730 and service provider computers 714 may be configured to generate an unencrypted encode of the video portion of the media content. The unencrypted encode of the video portion may be of a different, and sometimes, lower quality than the quality of the media content provided by the content creators or publishers. For example, the media content may be provided in a 1080p quality whereas the unencrypted encode of the video portion may correspond to a 480p quality. The boundary generation module 730 and the service provider computers 714 may be configured to implement one or more algorithms (e.g., computer vision markup language (CVML) algorithm, first algorithm, priority algorithm, second algorithm, etc.) for generating one or more sets of time stamps associated with the video portion of the media content. For example, the CVML algorithm may be implemented and invoked to analyze the unencrypted encode of the video portion to generate a second set of time stamps which may correspond to ideal or appropriate locations for boundary points which serve as opportunities to interleave additional content. As another example, the first algorithm may be an algorithm that is configured to identify instantaneous decoder refresh (IDR) frames in the unencrypted encode of the video portion which are located in their default location from previous encodes generated during creation of the media content by the content creator or publisher.

As yet another example, the priority algorithm may be configured to rank or otherwise select a set of timestamps from the first set of time stamps, the second set of time stamps, and the third set of time stamps according to a priority assigned to each set of time stamps. In embodiments, the boundary generation module 730 and service provider computers 714 may be configured to encode the video portion of the media content using a set of time stamps (fourth set of time stamps) generated by the priority algorithm to determine updated IDR frame locations for the media content. The boundary generation module 730 and service provider computers 714 may be configured to encode the audio portion of the media content using the fourth set of time stamps and a second algorithm that is configured to synchronize first fragments of the audio portion with the second fragments of the video portion. This ensures that no desynchronization occurs between the audio portion and the video portion during playback despite the update to the boundary points of the media content generated by the service provider computers 714 and boundary generation module 730.

Figure 8:
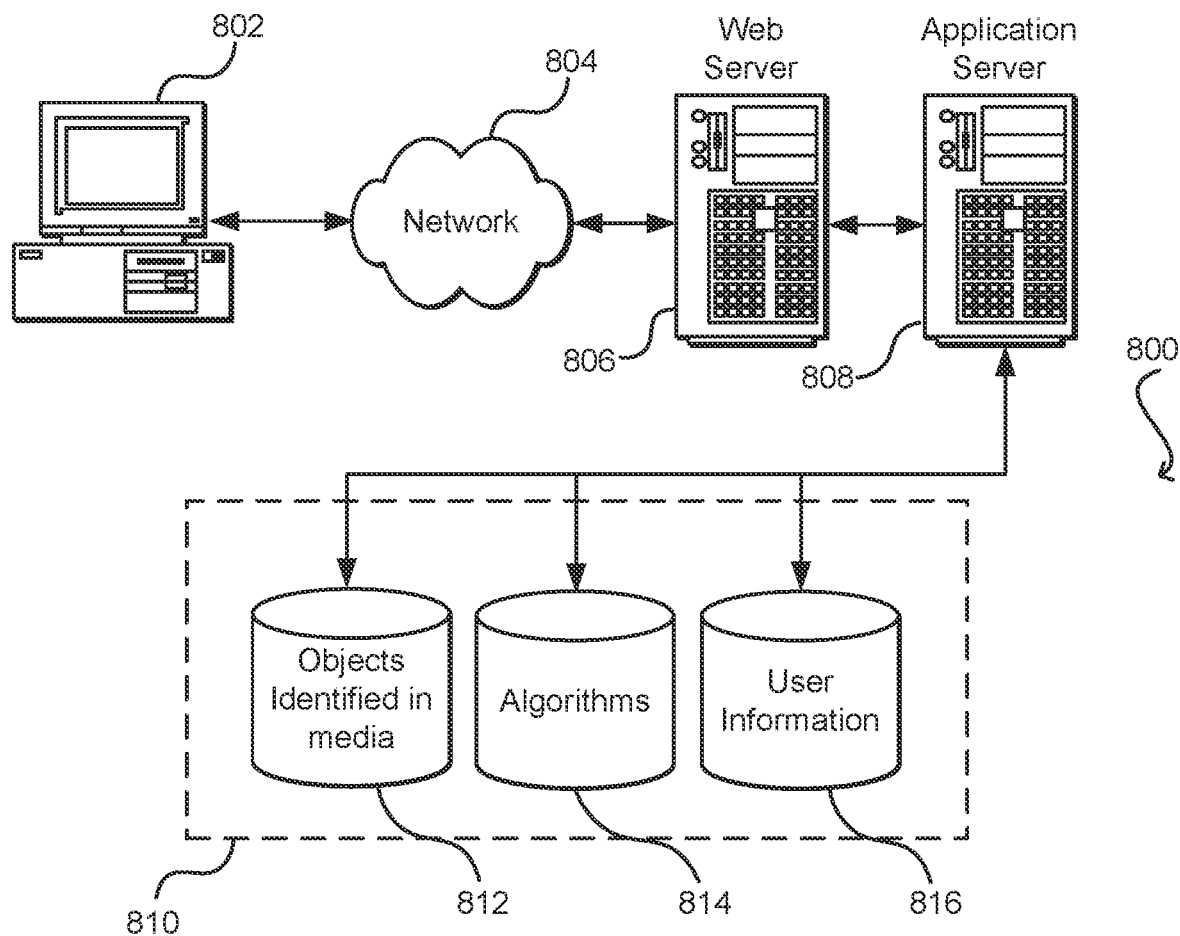
FIG. 8 illustrates an environment in which various embodiments can be implemented.

FIG. 8 illustrates aspects of an example environment 800 for implementing aspects in accordance with various embodiments. As will be appreciated, although a Web-based environment is used for purposes of explanation, different environments may be used, as appropriate, to implement various embodiments. The environment includes an electronic client device 802, which can include any appropriate device operable to send and receive requests, messages, or information over an appropriate network 804 and convey information back to a user of the device. Examples of such client devices include personal computers, cell phones, handheld messaging devices, laptop computers, set-top boxes, personal data assistants, electronic book readers, and the like. The network can include any appropriate network, including an intranet, the Internet, a cellular network, a local area network, or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a Web server 806 for receiving requests and serving content in response thereto, although for other networks an alternative device serving a similar purpose could be used as would be apparent to one of ordinary skill in the art.

In some examples, cell phones (or, more broadly, mobile phones) may be one specific type of mobile device that is an example of the electronic client device 802. In some instances, a user's mobile device may be considered their primary client device. Other example mobile devices include wearables, such as watches, worn sensors (e.g., rings, bracelets, etc.), cameras, eyeglasses, and the like, which may be considered "connected" auxiliary devices. In some examples, the combination of a user's primary mobile device and all or some of their connected, auxiliary devices, may make up a single mobile system configured to communicate with the Web server 806 or other servers over the network 804 or other networks.

The illustrative environment includes at least one application server 808 and a data store 810. It should be understood that there can be several application servers, layers, or other elements, processes, or components, which may be chained or otherwise configured, which can interact to perform tasks such as obtaining data from an appropriate data store. As used herein the term "data store" refers to any device or combination of devices capable of storing, accessing, and retrieving data, which may include any combination and number of data servers, databases, data storage devices, and data storage media, in any standard, distributed, or clustered environment. The application server 808 can include any appropriate hardware and software for integrating with the data store 810 as needed to execute aspects of one or more applications for the client device 802, handling a majority of the data access and business logic for an application. The application server 808 provides access control services in cooperation with the data store 810 and is able to generate content such as text, graphics, audio, and/or video to be transferred to the user, which may be served to the user by the Web server in the form of Hyper Text Markup Language ("HTML"), Extensible Markup Language ("XML"), or another appropriate structured language in this example. The handling of all requests and responses, as well as the delivery of content between the client device 802 and the application server 808, can be handled by the Web server 806. It should be understood that the Web and application servers (806 and 808) are not required and are merely example components, as structured code discussed herein can be executed on any appropriate device or host machine as discussed elsewhere herein.

The data store 810 can include several separate data tables, databases or other data storage mechanisms and media for storing data relating to a particular aspect. For example, the data store 810 illustrated includes mechanisms for storing objects identified in media 812 and user information 816, which can be used to serve content for the production side as well as identify virtual product placement opportunities for advertisers. The data store 810 also is shown to include a mechanism for storing algorithms 814, which can be used for reporting, analysis, or other such purposes such as identifying dialogue pauses, scene changes, shot changes, or other opportunities which may serve as boundary points for interleaving additional content into media content. It should be understood that there can be many other aspects that may need to be stored in the data store 810, such as for page image information and to access right information, which can be stored in any of the above listed mechanisms as appropriate or in additional mechanisms in the data store 810. The data store 810 is operable, through logic associated therewith, to receive instructions from the application server 808 and obtain, update or otherwise process data in response thereto. In one example, a user might submit a search request for a certain type of item. In this case, the data store 810 might access the user information 816 to verify the identity of the user and can access the catalog detail information to obtain information about items of that type. The information then can be returned to the user, such as in a results listing on a Web page that the user is able to view via a browser on the user device 802. Information for a particular item of interest can be viewed in a dedicated page or window of the browser. In another example, a user might submit a request for media content. In this case, the data store 810 might invoke one or more algorithms stored in algorithms 814 to generate appropriate boundaries for the media content, serve the media content to user device 802, and provide instructions for interleaving additional content into the media content to the user device 802 for supplementing the playback experience during presentation of the media content.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 8. Thus, the depiction of the system 800 in FIG. 8 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Most embodiments utilize at least one network that would be familiar to those skilled in the art for supporting communications using any of a variety of commercially-available protocols, such as Transmission Control Protocol/Internet Protocol ("TCP/IP"), Open System Interconnection ("OSI"), File Transfer Protocol ("FTP"), Universal Plug and Play ("UpnP"), Network File System ("NFS"), Common Internet File System ("CIFS"), and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including Hypertext Transfer Protocol ("HTTP") servers, FTP servers, Common Gateway Interface ("CGI") servers, data servers, Java servers, and business application servers. The server(s) also may be capable of executing programs or scripts in response to requests from user devices, such as by executing one or more Web applications that may be implemented as one or more scripts or programs written in any programming language, such as Java®, C, C #, or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit ("CPU"), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired)), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory ("EEPROM"), flash memory or other memory technology, Compact Disc Read-Only Memory ("CD-ROM"), digital versatile disk (DVD), or other optical storage, magnetic cassettes, magnetic tape, magnetic disk storage, or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A computer-implemented method, comprising:
   receiving, by a computer system, a request for additional content to be provided in association with media content that includes a video portion and an audio portion, the request comprising an indication of a set of time stamps serving as boundaries for interleaving the additional content into the media content, wherein the set of time stamps comprises at least two different sets of time stamps, wherein one of the at least two different sets of time stamps is specified by a content provider associated with the media content, and wherein a different one of the at least two different sets of time stamps is generated using an algorithm for identifying instantaneous decoder refresh (IDR) frames in the video portion;
   accessing, by the computer system, one or more identifications of the media content and one or more personalization parameters, the one or more identifications characterizing the media content, and the one or more personalization parameters indicating historical interactions of a user profile;
   adjusting, by the computer system, the request by augmenting the one or more identifications and the one or more personalization parameters with the request to generate an updated request, the updated request indicating a request for identifying the additional content based at least in part on the one or more identifications and the one or more personalization parameters;
   receiving, by the computer system and in response to transmitting the updated request to a content server, the additional content;
   interleaving, by the computer system, the additional content into the media content using the set of time stamps to generate updated media content; and
   facilitating, by the computer system, access to the updated media content.

2. The computer-implemented method of claim 1, further comprising generating, by the computing system, the set of time stamps by:
   determining a plurality of priorities for a first set of time stamps, a second set of time stamps, and a third set of time stamps based at least in part on the one or more personalization parameters, wherein the first set of time stamps, the second set of time stamps, and the third set of time stamps are included in the at least two different sets of time stamps; and
   generating, by using a priority algorithm that uses the plurality of priorities, the set of time stamps based at least in part on the first set of time stamps, the second set of time stamps, and the third set of time stamps.

3. The computer-implemented method of claim 2, wherein the computer-implemented method further comprises:
   generating, by the computer system, the second set of time stamps based at least in part on implementing a computer vision algorithm that uses an unencrypted encode of the video portion; and
   generating, by the computer system, an unencrypted encode of the video portion of the media content that is used to generate at least the third set of time stamps.

4. The computer-implemented method of claim 1, wherein each time stamp of the set of time stamps comprises an indication of whether the time stamp is a potential location for virtual content placement into the media content, and wherein interleaving the additional content into the media content comprises performing virtual content placement to insert virtual content into the media content based at least in part on the indication.

5. The computer-implemented method of claim 1, wherein interleaving the additional content comprises encoding the audio portion of the media content using the set of time stamps and an algorithm for synching fragments of the audio portion with fragments of the video portion.

6. The computer-implemented method of claim 1, wherein the personalization parameters comprise contextual information about historical interactions of the user profile, and wherein the contextual information comprises user profile information about user interaction with historical boundaries of media content.

7. The computer-implemented method of claim 1, wherein receiving the additional content comprises determining the additional content to interleave in the media content based at least in part on the personalization parameters and the one or more identifications.

8. A non-transitory computer-readable medium comprising instructions stored thereon that, when executed by a processor, configure the processor to perform operations, comprising:
   receiving a request for additional content to be provided in association with media content that includes a video portion and an audio portion, the request comprising an indication of a set of time stamps serving as boundaries for interleaving the additional content into the media content, wherein the set of time stamps comprises at least two different sets of time stamps, wherein one of the at least two different sets of time stamps is configured to be specified by a content provider associated with the media content, and wherein a different one of the at least two different sets of time stamps is generatable using an algorithm for identifying instantaneous decoder refresh (IDR) frames in the video portion;
   accessing one or more identifications of the media content and one or more personalization parameters, the one or more identifications characterizing the media content, and the one or more personalization parameters indicating historical interactions of a user profile;
   adjusting the request by augmenting the one or more identifications and the one or more personalization parameters with the request to generate an updated request, the updated request indicating a request for identifying the additional content based at least in part on the one or more identifications and the one or more personalization parameters;

receiving, in response to transmitting the updated request to a content server, the additional content;

interleaving the additional content into the media content using the set of time stamps to generate updated media content; and facilitating access to the updated media content.

9. The non-transitory computer-readable medium of claim 8, wherein the operations further comprise generating an unencrypted encode of the video portion, wherein the unencrypted encode is a different quality than an original quality of the media content, wherein the unencrypted encode is generated based at least in part on a constant variable bit rate.

10. The non-transitory computer-readable medium of claim 8, wherein the operations further comprise generating the set of time stamps by:

determining a plurality of priorities for a first set of time stamps, a second set of time stamps, and a third set of time stamps based at least in part on the one or more personalization parameters, wherein the first set of time stamps, the second set of time stamps, and the third set of time stamps are included in the at least two different sets of time stamps; and generating, by using a priority algorithm that uses the plurality of priorities, the set of time stamps based at least in part on the first set of time stamps, the second set of time stamps, and the third set of time stamps.

11. The non-transitory computer-readable medium of claim 10, wherein the operation of determining the plurality of priorities comprises using historical user interaction data with historical boundaries of media content to adjust the plurality of priorities.

12. The non-transitory computer-readable medium of claim 10, wherein the operations further comprise:

transmitting the set of time stamps and the video portion to a content provider computer associated with the media content;

receiving, from the content provider computer, instructions that identify override time stamps for the set of time stamps; and updating the set of time stamps using the override time stamps from the content provider computer.

13. The non-transitory computer-readable medium of claim 8, wherein the operation of receiving the additional content comprises determining the additional content to interleave in the media content based at least in part on the personalization parameters and the one or more identifications.

14. The non-transitory computer-readable medium of claim 8, wherein the operation of interleaving the additional content comprises encoding the audio portion of the media content using the set of time stamps and an algorithm for synching fragments of the audio portion with fragments of the video portion.

15. A computer system comprising:

a memory configured to store computer-executable instructions; and a processor in communication with the memory configured to execute the computer-executable instructions to perform operations comprising:

receiving a request for additional content to be provided in association with media content that includes a video portion and an audio portion, the request comprising an indication of a set of time stamps serving as boundaries for interleaving the additional content into the media content, wherein the set of time stamps comprises at least two different sets of time stamps, wherein one of the at least two different sets of time stamps is configured to be specified by a content provider associated with the media content, and wherein a different one of the at least two different sets of time stamps is generatable using an algorithm for identifying instantaneous decoder refresh (IDR) frames in the video portion;

accessing one or more identifications of the media content and one or more personalization parameters, the one or more identifications characterizing the media content, and the one or more personalization parameters indicating historical interactions of a user profile;

adjusting the request by augmenting the one or more identifications and the one or more personalization parameters with the request to generate an updated request, the updated request indicating a request for identifying the additional content based at least in part on the one or more identifications and the one or more personalization parameters;

receiving, in response to transmitting the updated request to a content server, the additional content;

interleaving the additional content into the media content using the set of time stamps to generate updated media content; and facilitating access to the updated media content.

16. The computer system of claim 15, wherein the operations further comprise generating the set of time stamps by:

determining a plurality of priorities for a first set of time stamps, a second set of time stamps, and a third set of time stamps based at least in part on the one or more personalization parameters, wherein the first set of time stamps, the second set of time stamps, and the third set of time stamps are included in the at least two different sets of time stamps; and generating, by using a priority algorithm that uses the plurality of priorities, the set of time stamps based at least in part on the first set of time stamps, the second set of time stamps, and the third set of time stamps.

17. The computer system of claim 16, wherein the operations further comprise:

generating the second set of time stamps based at least in part on implementing a computer vision algorithm that uses an unencrypted encode of the video portion.

18. The computer system of claim 15, wherein the operation of interleaving the additional content comprises encoding the audio portion of the media content using the set of time stamps and an algorithm for synching fragments of the audio portion with fragments of the video portion.

19. The computer system of claim 15, wherein the personalization parameters comprise contextual information about historical interactions of the user profile, and wherein the contextual information comprises user profile information about user interaction with historical boundaries of media content.

20. The computer system of claim 15, wherein the operation of receiving the additional content comprises determining the additional content to interleave in the media content based at least in part on the personalization parameters and the one or more identifications.

* * * * *